Patented Oct. 31, 1922.

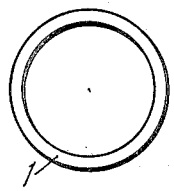
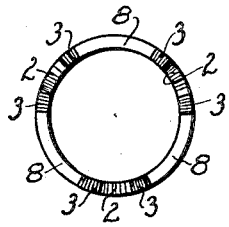
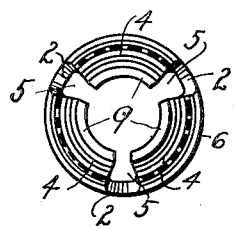
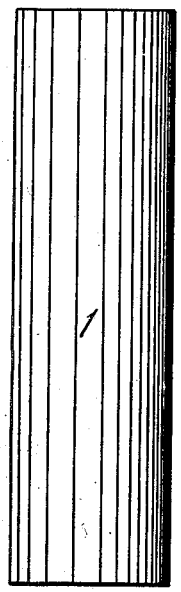
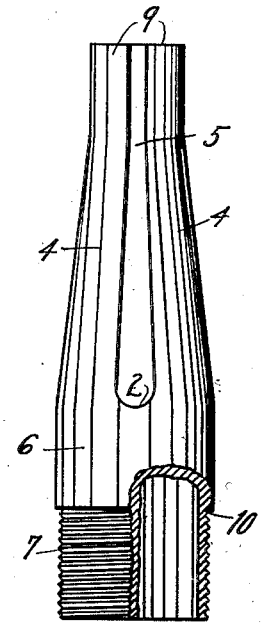

1,433,890

UNITED STATES PATENT OFFICE.

ROBERT A. JOHNSON AND CHARLES J. FANCHER, OF BRATTLEBORO, VERMONT, ASSIGNORS TO THE NATIONAL ACME COMPANY. OF CLEVELAND, OHIO, A CORPORATION OF OHIO.

FEED COLLET AND METHOD OF MAKING THE SAME.

Application filed April 29, 1920. Serial No. 377,602.

*To all whom it may concern:*

Be it known that we, ROBERT A. JOHNSON and CHARLES J. FANCHER, both citizens of the United States of America, and residents of Brattleboro, in the county of Windham and State of Vermont, have invented a new and useful Feed Collet and Method of Making the Same, of which the following is a specification.

Our invention relates to improvements in collets used in automatic and hand-operative screw-machines, bar-forming machines, and the like, for feeding the stock, and in the method of manufacturing, the same, said method consisting in drilling and slotting in a certain peculiar manner a piece of seamless tubing, and then, forming the slotted parts of said tubing to the required size and shape, and said collet consisting of the implement thus produced, all as hereinafter set forth.

In the process of forming down the fingers of the collet, they are given the required shape and size to adapt them for the work for which they are intended, which shape and size will vary for different kinds of work. The butt end of the collet is screw-threaded thereby providing a means for detachably attaching the collet to the end of a stock bar feed tube and the entire device is finally spring tempered and polished.

Heretofore collets of the character described or for the purpose set forth above have been made out of solid stock which has to be bored, slotted, and turned down. Collets constructed in this manner are difficult and expensive to make, and are not so strong and durable as the collet which forms the subject of the present application. The primary object of our invention is, therefore, to produce a feed collet of the kind set forth which is both simple and comparatively inexpensive in construction, while at the same time being strong, durable, highly efficient, and capable of performing in a satisfactory manner the functions required of such a feeding device.

Other objects and advantages will appear in the course of the following description.

This invention is in the nature of an improvement of the feed collet covered by our application for United States Letters Patent filed on or about February 13, 1920, Serial No. 358,501.

We attain the objects and secure the advantages of our invention by the means illustrated in the accompanying drawings, in which—

Figure 1 is a top plan of a piece of tubing from which a collet that is a practical embodiment of our invention is made; Fig. 2, a side elevation of said tubing; Fig. 3, a top plan of said tubing after the same has been bored and slotted in the carrying out of the new method; Fig. 4, a side elevation of the bored and slotted member; Fig. 5, a top plan of the complete collet, and, Fig. 6, a side elevation, partially broken out at the butt end, of said collet.

Similar reference numerals designate similar parts throughout the several views.

This feed collet may be made with two or more resilient gripping fingers as desired, three being shown in the example herein presented.

Our method of making the new collet consists in taking a length of seamless tubing, as 1; boring or drilling a plurality of holes through the sides of the tube at equal distances from each other around the same, and at a considerably greater distance from one end of the tube than from the other end thereof, as at 2; in sawing V-shaped slots in from one end of the tube to said holes, as at 3, in Figs. 3 and 4, such slots opening through the end of the tube which is the more remote from the aforesaid holes; in pressing the slotted portions of the tube to form the free ends of such portions to the size and shape required; in screw-threading the butt end, which is the unbroken end, of the slotted member, and in spring tempering the collet thus produced or the fingers thereof. The collet should finally be polished.

The collet produced by the method described above is illustrated in Figs. 5 and 6, wherein it will be seen that said collet is provided with three fingers 4 separated by slots 5, the latter having originally formed the slots 3. The unslotted portion or butt end of the collet may be termed a body 6, and such body for about one-half of its length is externally screw-threaded at 7. The screw-threads 7 are those produced by one step in the method as described above, and they are at the outer terminal portion of the body 6. Before cutting the screw-threads 7, the body 6 is turned down to form an exterior shoulder 10 about midway between the outer and inner ends of said body, or the outer end of said body and the inner ends of the slots 5. The screw-threaded part of the collet affords means for attaching said collet to the operating member therefor in the machine in which the collet is used. The shoulder 10 affords a stop for the collet when the same is screwed into the aforesaid operating member.

When the tube 1, after being bored and slotted, is pressed or rolled and formed to produce the collet, the slotted portions of said tube, at their outer terminals, are drawn together into a hollow cylinder of less diameter than that of the body 6, the walls of which cylinder are broken, however, by the slots. The slotted portions of the tube 1, to which reference has just been made, may be termed finger pieces 8. At the same time the outer terminal portions of the finger pieces 8 are drawn together, the portions of said finger pieces, which are between the body 6 and the cylindrical terminal portions of said finger pieces, are given a tapering configuration both exteriorly and interiorly. Thus it is seen that the fingers 4 have a conical cylindrical sectional form. The opening or passage through the body 6 is large and cylindrical, the axial opening or passage through the fingers 4, which latter passage is, of course, a continuation of said first-named passage, tapers and grows smaller as the finger tips are approached, and the outer terminal portion of said last-named passage is substantially cylindrical and considerably smaller than the passage through said body, as stated above. It is the portions of the fingers 4 through which extends the small, cylindrical, axial passage, of which mention has just been made, that grip the stock. Inasmuch as the fingers 4 are resilient, they can feed or assist in feeding the stock as well as grip the same. The stock-gripping parts of the fingers 4 are represented at 9.

The collet is used and operates in a similar manner to collets constructed out of solid material and in the old way, the stock fed by our collet extending through the same just as is the case with the others.

The thickness of the tube out of which the collet is made will vary according to circumstances.

This collet is stronger than the old type, due to the fact that it is made of material both surfaces of which have been subjected to the compressing action of the rolls used in producing the stock from which the tube is made, so that such material is more dense and the grain is laid lengthwise. Usually sheet-steel tubing is employed, in which the grain extends lengthwise, consequently the inner surface is as strong as the outer surface. This is not the case with a drilled collet, inasmuch as the operation of drilling the solid stock weakens the inner surface produced by such operation, and this is the surface which is subjected to the most strain when the collet is in use.

The fingers of different collets will vary somewhat in the manner of their construction and in shape, so as to adapt them to fit various sizes of rods or bars of stock, and to different shapes in cross section of such bars or rods, such as round, square, hexagonal, etc. By making the collet in this way, the walls of the fingers are uniform, so that one wall is not thinner than another, which would necessarily weaken the fingers and result in breakage thereof. Moreover, by making the collet in this way, the fingers can be readily tapered whereby they are of increased width at their bases or inner ends, and consequently stronger at this point where the strain is the greatest, whereas in collets drilled from the solid bar, and which require the formation of openings at the inner ends of the fingers to prevent the formation of angles, which weaken the structure during the hardening process, the bases of the fingers, which are not tapered and cannot be readily tapered, are narrower and therefore weaker at this point, and it is a fact that in collets drilled from a solid bar the fingers very frequently break at this point. Moreover, a collet drilled from a solid bar does not have the same resiliency in the fingers and therefore can not readily be drawn or pressed inwardly toward the center in the same manner as in the present collet, since the metal will not stand it.

Furthermore, in forming collets from a drilled bar, it is necessary to increase the thickness to form pads as they are called, at the outer ends of the collet, and then plane them or shape these pads into hex, oval or square form to conform to the shape of the stock to be fed. All of this is avoided in the present improvement because the outer ends of the resilient fingers can be readily shaped by pressure into the desired form as hex, square or oval. These pads in the drilled collet are a great disadvantage, aside from the great expense in forming them, because they form shoulders on the interior of the collet, which interfere with the feeding of the stock into the collet, and frequently when the end of the stock hits these shoulders, the stock is jammed and the fingers are frequently broken off.

What we claim as our invention, and desire to secure by Letters Patent, is—

1. A method of making feed collets consisting in perforating the sides of a tube, in slotting said tube from one end to the perforations therein, and in pressing the slotted portions of said tube to form fingers having gripping terminals.

2. A method of making feed collets consisting in perforating a tube, in sawing V-shaped slots in from one end of said tube to the perforations therein, and in pressing the slotted portions of said tube inwardly to form fingers with gripping terminals.

3. A method of making feed collets consisting in perforating a tube, in sawing V-shaped slots inwardly from one end of said tube to the perforations therein, in pressing inwardly the slotted portions of said tube to form fingers with gripping terminals, and in tempering said fingers.

4. As an improved article of manufacture, a detachable feed collet having at one end means adapted for attachment to the end of a stock bar feed tube and comprising a seamless non-bored tube bored transversely and slotted to form fingers with gripping terminals.

5. As an improved article of manufacture, a detachable feed collet adapted for attachment to the end of a stock bar feed tube and comprising a seamless non-bored tube bored transversely and slotted to form fingers with gripping terminals and screw-threaded at the end opposite said gripping terminals.

6. As an article of manufacture, a detachable feed collet adapted for attachment to the end of a stock bar feed tube and comprising a seamless non-bored tube bored transversely and slotted to form tapered resilient fingers with gripping terminals and screw-threaded at the end opposite said gripping terminals.

7. As an improved article of manufacture, a detachable feed collet having at one end means adapted for attachment to the end of a stock bar feed tube and comprising a seamless non-bored tube having a plurality of resilient gripping members.

8. As an improved article of manufacture, a detachable feed collet having at one end means adapted for attachment to the end of a stock bar feed tube and comprising a seamless non-bored tube having a plurality of spaced, tapered, spring tempered, resilient fingers.

9. As an improved article of manufacture, a detachable feed collet having at one end means adapted for attachment to the end of a stock bar feed tube and comprising a seamless non-bored tube having a plurality of spaced resilient tapered fingers inwardly pressed toward the center thereof to form gripping surfaces.

10. The method of making a feed collet adapted for detachable attachment to the end of a feed bar stock tube, which consists in slotting a seamless non-bored tube to form a plurality of gripping fingers, and then pressing said fingers toward one another.

11. The method of making a feed collet, which consists in slotting a seamless tube to form a plurality of spaced resilient gripping members, and then pressing said members toward the center to form gripping surfaces.

12. The method of making a feed collet, which consists in slotting a seamless tube to form a plurality of spaced and tapered resilient gripping members, and then pressing said members toward the center to form gripping surfaces.

13. The method of making a feed collet, which consists in slotting a seamless tube to form a plurality of spaced resilient tapered gripping members, then pressing said members inwardly to form a conical portion and pressing the ends of said conical portion to form elongated gripping surfaces conforming to the shape of the stock to be fed.

14. The method of making a feed collet, which consists in slotting a seamless tube to form a plurality of tapered resilient gripping members having V-shaped spaces therebetween, and then pressing said members inwardly to form a conical portion and the ends of said conical portion to form elongated gripping surfaces conforming to the shape of the stock to be fed.

15. The method of making a feed collet which consists in slotting a seamless non-bored tube to form a plurality of gripping fingers and then drawing said fingers toward one another, and then spring tempering the fingers.

R. A. JOHNSON.
C. J. FANCHER.

Witnesses:
RUTH E. HOWE,
CARL S. HOPKINS.